(12) United States Patent
Ito et al.

(10) Patent No.: US 9,931,930 B2
(45) Date of Patent: Apr. 3, 2018

(54) DRIVING FORCE TRANSMISSION APPARATUS AND FOUR-WHEEL DRIVE VEHICLE

(71) Applicant: JTEKT CORPORATION, Osaka-shi (JP)

(72) Inventors: Isao Ito, Iwakura (JP); Hiroshi Takuno, Nukata-gun (JP); Noriyuki Fujii, Hekinan (JP); Ryouichi Kubo, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/483,045

(22) Filed: Apr. 10, 2017

(65) Prior Publication Data

US 2017/0297429 A1 Oct. 19, 2017

(30) Foreign Application Priority Data

Apr. 14, 2016 (JP) ................. 2016-081551

(51) Int. Cl.
*B60K 23/08* (2006.01)
*B60K 17/16* (2006.01)
(Continued)

(52) U.S. Cl.
CPC .............. *B60K 23/08* (2013.01); *B60K 17/16* (2013.01); *B60K 17/34* (2013.01); *F16D 13/52* (2013.01);
(Continued)

(58) Field of Classification Search
CPC ........ B60K 23/08; B60K 17/16; B60K 17/34; F16H 48/08; F16H 57/0483; F16D 13/52; F16D 27/115; F16D 2300/08
See application file for complete search history.

(56) References Cited

U.S. PATENT DOCUMENTS

| 5,711,389 A * | 1/1998 | Schlosser ............... B60K 17/36 180/197 |
| 8,795,125 B2 * | 8/2014 | Ziech ...................... B60K 17/36 180/248 |

(Continued)

FOREIGN PATENT DOCUMENTS

JP 2011-144858 7/2011

*Primary Examiner* — David J Hlavka
(74) *Attorney, Agent, or Firm* — Oblon, McClelland, Maier & Neustadt, L.L.P.

(57) ABSTRACT

A driving force transmission apparatus includes: a pinion gear shaft having a pinion teeth portion, a first shaft portion extending from one side of the pinion teeth portion, and a second shaft portion extending from the other side of the pinion teeth portion; a ring gear meshing with the pinion teeth portion; a clutch housing capable of rotating relative to the pinion gear shaft on a rotation axis in coincidence with a rotation axis of the pinion gear shaft; a clutch mechanism located between the clutch housing and the first shaft portion of the pinion gear shaft; and a differential carrier accommodating the ring gear. The first shaft portion and the second shaft portion of the pinion gear shaft are supported by a first bearing and a second bearing, respectively. The clutch housing is supported by the pinion gear shaft through a third bearing fitted on the first shaft portion.

9 Claims, 3 Drawing Sheets

(51) Int. Cl.
*B60K 17/34* (2006.01)
*F16D 13/52* (2006.01)
*F16D 27/115* (2006.01)
*F16H 48/08* (2006.01)
*F16H 57/04* (2010.01)

(52) U.S. Cl.
CPC .......... *F16D 27/115* (2013.01); *F16H 48/08* (2013.01); *F16D 2300/08* (2013.01); *F16H 57/0483* (2013.01)

(56) References Cited

U.S. PATENT DOCUMENTS

| | | | |
|---|---|---|---|
| 2003/0178237 A1* | 9/2003 | Terada | F16D 41/088 180/249 |
| 2008/0053780 A1* | 3/2008 | Hamrin | B60K 23/08 192/54.52 |
| 2008/0146396 A1* | 6/2008 | Millar | B60K 17/34 475/199 |
| 2014/0027236 A1* | 1/2014 | Ando | F16D 13/385 192/48.2 |
| 2015/0057090 A1* | 2/2015 | Yamazaki | B60K 17/16 464/61.1 |
| 2015/0159743 A1* | 6/2015 | Palmer | F16D 41/088 74/650 |

* cited by examiner

DRIVING FORCE TRANSMISSION APPARATUS AND FOUR-WHEEL DRIVE VEHICLE

INCORPORATION BY REFERENCE

The disclosure of Japanese Patent Application No. 2016-081551 filed on Apr. 14, 2016 including the specification, drawings and abstract is incorporated herein by reference in its entirety.

BACKGROUND OF THE INVENTION

1. Field of the Invention

The invention relates to a driving force transmission apparatus adapted to be mounted on a vehicle to selectively transmit a driving force, and also relates to a four-wheel drive vehicle.

2. Description of Related Art

Driving force transmission apparatuses that are mounted on a four-wheel drive vehicle with main drive wheels and auxiliary drive wheels and that transmit a driving force to the auxiliary drive wheels have been known, as disclosed in, for example, Japanese Patent Application Publication No. 2011-144858 (JP 2011-144858 A).

The driving force transmission apparatus disclosed in JP 2011-14858 A includes a cylindrical outer rotating member coupled to an input member so as to rotate along with the input member, a pinion gear shaft (an inner rotating member) capable of rotating relative to the outer rotating member inside the outer rotating member, a clutch section located between the outer rotating member and the pinion gear shaft, and a differential mechanism for differentially distributing, to a pair of output members, a driving force transmitted through the clutch section to the pinion gear shaft. The differential mechanism includes a differential case, a pinion shaft fixed to the differential case, a pair of pinion gears rotatably supported on the pinion shaft, and a pair of side gears meshing with the pair of pinion gears. The pinion gear shaft has a pinion teeth portion at one end. A ring gear is fixed to the outer periphery of the differential case and meshes with the pinion teeth portion to transmit the driving force to the differential case.

A static casing that accommodates the differential mechanism supports the pinion gear shaft through a unit bearing assembly having two tapered roller bearings. The unit bearing assembly is located around an end of a shaft portion which is provided with the pinion teeth portion formed as a single piece with the shaft portion. The axial portion of the unit bearing assembly is fixed by a bearing nut threadely engaged with the pinion gear shaft. The outer rotating member is rotatably supported on the pinion gear shaft through a pair of bearings. The clutch section includes multiple inner clutch plates spline-engaged with the pinion gear shaft and multiple outer clutch plates spline-engaged with the outer rotating member. The inner clutch plates are engaged with an engagement portion formed at an end of the pinion gear shaft that is opposite to the end provided with the pinion teeth portion. This engagement prevents relative rotation between the pinion gear shaft and the inner clutch plates.

In the driving force transmission apparatus described in JP 2011-144858 A, the pinion gear shaft outputs, from the pinion teeth portion, the driving force inputted from the inner clutch plates. The pinion gear shaft needs to have rigidity enough to dampen torsion caused by the driving force being transmitted. This torsion is further dampened as the distance between the pinion teeth portion of the pinion gear shaft and the engagement portion of the pinion gear shaft that the inner clutch plates are engaged with is shorter. In other words, the torsion is further dampened as a driving force transmission distance over which the driving force is transmitted is shorter. Therefore, reducing the distance between the engagement portion and the pinion teeth portion allows a reduction in the diameter and length of the pinion gear shaft, thus allowing a reduction in the size and weight of the apparatus. Unfortunately, in the driving force transmission apparatus described in JP 2011-144858 A, the unit bearing assembly and the bearing nut are arranged between the pinion teeth portion of the pinion gear shaft and the clutch section, and this arrangement imposes limitations on the reduction in the driving force transmission distance, thus making it difficult to reduce the size and weight.

Further, when the input member coupled to the outer rotating member is a joint of a propeller shaft, ensuring the rigidity of the pinion gear shaft becomes more important because the pinion gear shat is required to support the weight of the propeller shaft.

SUMMARY OF THE INVENTION

An object of the invention is to provide a driving force transmission apparatus and a four-wheel drive vehicle that allow a reduction in a distance over which a pinion gear shaft transmits a driving force, thus allowing a reduction in their size and weight.

An aspect of the invention provides a driving force transmission apparatus including a pinion gear shaft, a large diameter gear, a cylindrical rotating member, a clutch mechanism, and a case member. The pinion gear shaft includes a pinion teeth portion formed as a bevel gear, a first shaft portion extending from a large end of the pinion teeth portion, and a second shaft portion extending from a small end of the pinion teeth portion. The large diameter gear meshes with the pinion teeth portion and is formed of a bevel gear larger in diameter than the pinion teeth portion. The cylindrical rotating member has a cylindrical portion that accommodates at least part of the first shaft portion. The cylindrical rotating member is rotatable relative to the pinion gear shaft on a rotation axis in coincidence with a rotation axis of the pinion gear shaft. The clutch mechanism is located between the cylindrical portion of the cylindrical rotating member and the first shaft portion of the pinion gear shaft. The case member accommodates the pinion teeth portion and the second shat portion of the pinion gear shaft, and the large diameter gear. A driving force is transmitted between the cylindrical rotating member and the large diameter gear through the clutch mechanism and the pinion gear shaft. The first shaft portion of the pinion gear shaft is supported by the case member through a first bearing and the second shat portion of the pinion gear shaft is supported by the case member through a second bearing. The cylindrical rotating member is supported by the pinion gear shaft through a third bearing fitted on the first shaft portion.

Another aspect of the invention provides a four-wheel drive vehicle including the above-described driving force transmission apparatus. The four-wheel drive vehicle is configured such that the driving force of a driving source is always transmitted to a pair of right and left front wheels and such that the driving force of the driving source is transmitted through the driving force transmission apparatus to a pair of right and left rear wheels. The cylindrical rotating member is coupled to a drive shaft for transmitting the driving force in a vehicle longitudinal direction. The pinion gear shaft supports one end of the drive shaft through the cylindrical rotating member.

These aspects reduce the distance over which the pinion gear shaft transmits the driving force, thus allowing a reduction in the size and weight of the driving force transmission apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
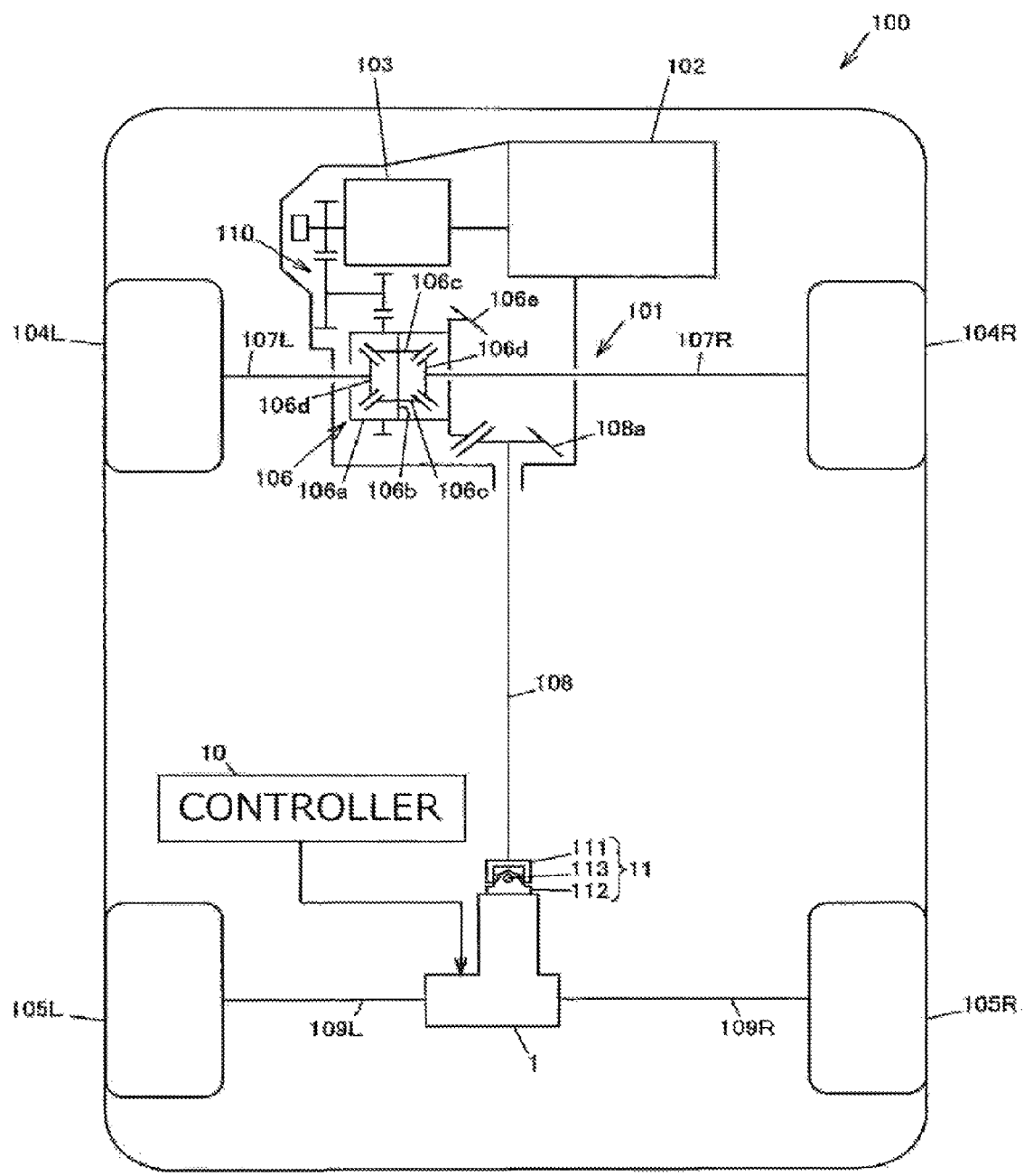
FIG. 1 is a diagram illustrating an example configuration of a four-wheel drive vehicle on which a driving force transmission apparatus according to an embodiment of the invention is mounted.
Figure 2:
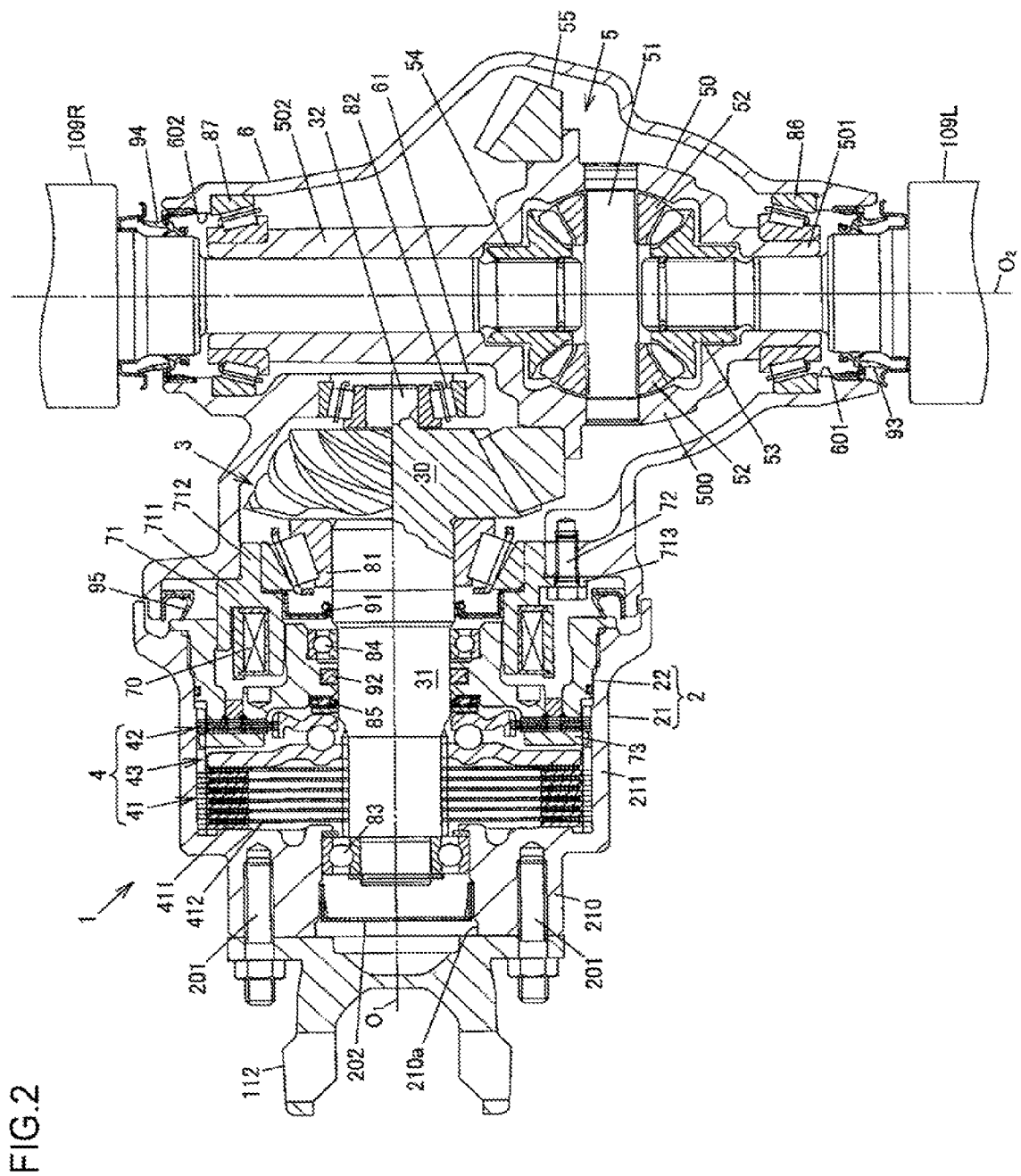
FIG. 2 is a sectional view illustrating the driving force transmission apparatus.
Figure 3:
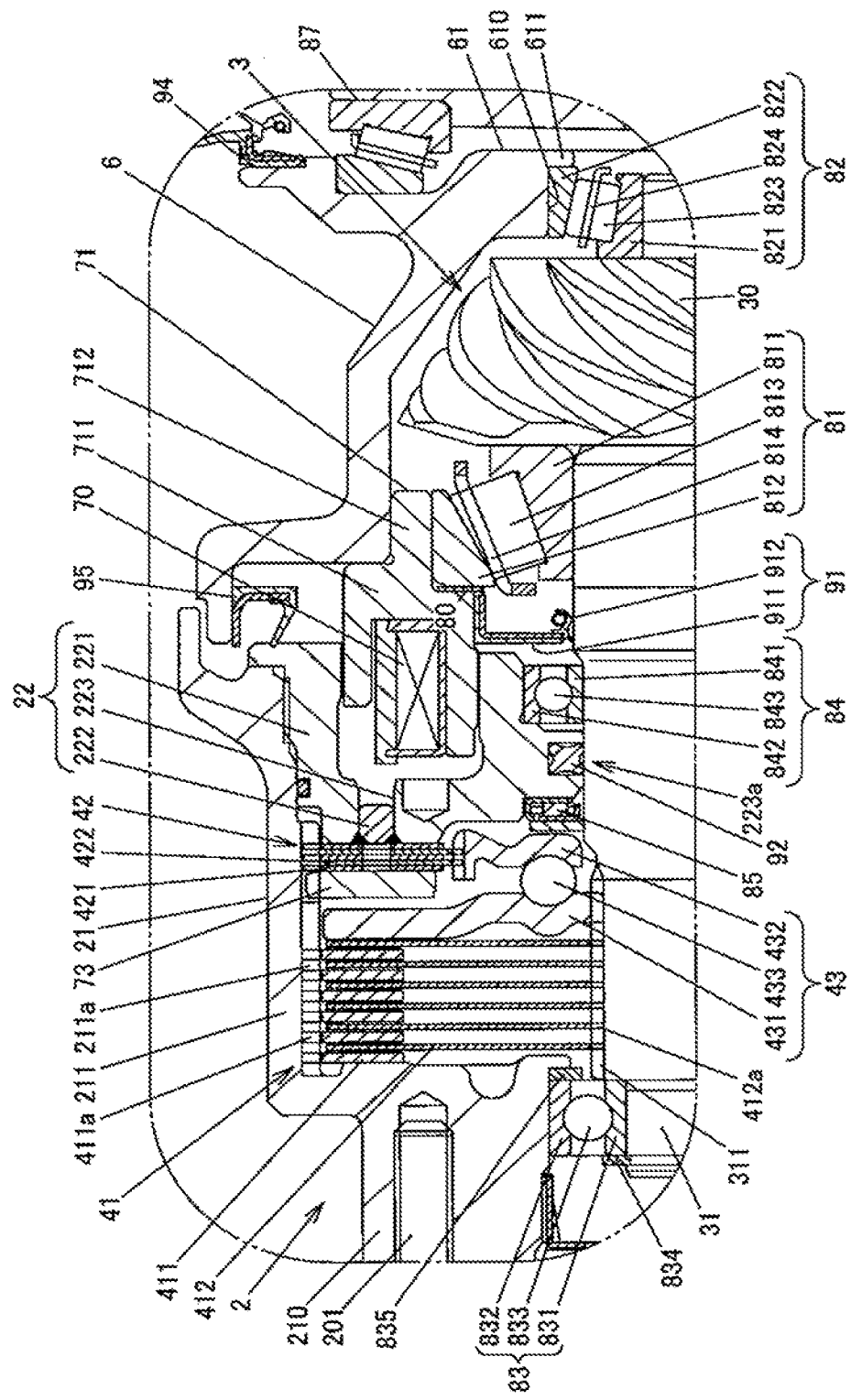
FIG. 3 is a partial enlarged view of FIG. 2.

An embodiment of the invention is described with reference to FIG. 1 through FIG. 3. FIG. 1 is a diagram illustrating an example configuration of a four-wheel drive vehicle 100 on which a driving force transmission apparatus 1 according to the embodiment of the invention is mounted. FIG. 2 is a sectional view illustrating the driving force transmission apparatus 1. FIG. 3 is a partial enlarged view of FIG. 2.

The four-wheel drive vehicle 100 includes an engine 102, a transmission 103, a pair of right and left front wheels 104R and 104L, a pair of right and left rear wheels 105R and 105L, a driving force transmission system 101, and a controller 10. The engine 102 serves as a driving source for generating a driving force to drive the four-wheel drive vehicle 100. The driving force transmission system 101 is capable of transmitting the driving force of the engine 102 to the front wheels 104R and 104L and to the rear wheels 104R and 105L. Throughout the embodiment, the notations "R" and "L" in reference numerals are respectively used to denote the right side and the left side with respect to a direction in which the four-wheel drive vehicle 100 moves forward.

The four-wheel drive vehicle 100 has switchable drive modes including a four-wheel drive mode and a two-wheel drive mode. The four-wheel drive mode transmits the driving force of the engine 102 to both the front wheels 104R and 104L, serving as main drive wheels and the rear wheels 105R and 105L serving as auxiliary drive wheels. The two-wheel drive mode transmits the driving force of the engine 102 to only the front wheels 104R and 104L. Although this embodiment takes an internal-combustion engine as an example of the driving source, the driving source is not limited to an internal-combustion engine. For example, the driving source my be a combination of an engine and a high-power electric motor, such as an interior permanent magnet (IPM) motor. Alternatively, the driving source may be a high-power electric motor alone.

The driving force transmission system 101 includes the driving force transmission apparatus 1, a front differential 106, front wheel drive axles 107R and 107L, a propeller shaft 108, and rear wheel drive axles 109R and 109L. The driving force transmission apparatus 1 is located between the propeller shaft 108 and the rear wheel drive axles 109R and 109L.

The front differential 106 includes a differential case 106a, a pinion shaft 106b supported by the differential case 106a, a pair of pinion gears 106c rotatably supported on the pinion shaft 106b, and a pair of side gears 106d that mesh with the pair of pinion gears 106c with their gear axes perpendicular to each other. A gear mechanism 110 transmits, to the differential case 106a, the driving force outputted from the transmission 103.

The propeller shaft 108 has a gear portion 108a at an end (i.e., a front end) that is away from the driving force transmission apparatus 1. The gear portion 108a meshes with a ring gear 106e that rotates along with the differential case 106a. The propeller shaft 108 is one aspect of a drive shaft, according to the invention, for transmitting a driving force in the longitudinal direction of a vehicle. A rear end of the propeller shaft 108, opposite to the front end, is coupled, by a cross joint 11, to a later-described front housing 21 of the driving force transmission apparatus 1. The cross joint 11 includes a first yoke 111 fixed to the propeller shaft 108, a second yoke 112 fixed to the front housing 21, and a cross spider 113.

The driving force distributed by the front differential 106 is always transmitted to the front wheels 104R and 104L, through the front wheel drive axles 107R and 107L. In the four-wheel drive mode, the driving force transmitted by the propeller shaft 108 is transmitted to the rear wheels 105R and 105L through the cross joint 11, the driving force transmission apparatus 1, and the rear wheel drive axles 109R and 109L. In the two-wheel drive mode, the driving force transmission apparatus 1 interrupts the transmission of the driving force from the propeller shaft 108 to the rear wheel drive axles 109R and 109L.

FIG. 2 illustrates a horizontal section of the example configuration of the driving force transmission apparatus 1. The right side in FIG. 2 represents a rear side (the rear wheels 105R and 105L side) in the longitudinal direction of the four-wheel drive vehicle 100 (hereinafter simply referred to as the "vehicle longitudinal direction") with the driving force transmission apparatus 1 mounted on the four-wheel drive vehicle 100. The left side in FIG. 2 represents a front side (the front wheels 104R and 104L side) in the vehicle longitudinal direction with the driving force transmission apparatus 1 mounted on the four-wheel drive vehicle 100. In the description below, the front side in the vehicle longitudinal direction is referred to as a "front side", and the rear side in the vehicle longitudinal direction is referred to as a "side".

As shown in FIG. 2, the driving force transmission apparatus 1 includes: a clutch housing 2 that is coupled by the cross joint 11 to the propeller shaft 108 (refer to FIG. 1) and that serves as a cylindrical rotating member; a pinion gear shaft 3 capable of rotating relative to the clutch housing 2 inside the clutch housing 2; a clutch mechanism 4 capable of selectively transmitting the driving force between the clutch housing 2 and the pinion gear shaft 3; a differential mechanism 5 that differentially distributes, to the rear wheel drive axles 109R and 109L, the driving force transmitted from the pinion gear shaft 3; a differential carrier 6 that accommodates the differential mechanism 5 and that serves as a case member; a coil 70 that generates an electromagnetic force for actuating the clutch mechanism 4; a coil housing 71 that retains the coil 70 and that is made of a soft magnetic metal, such as iron; an armature 73 that receives the electromagnetic force of the coil 70; bearings 81 to 87 that smooth rotation of components; and sealing members 91 to 95.

The clutch housing 2 includes a bottomed cylindrical front housing 21 and an annular rear housing 22. The front housing 21 is located closer to the front side than the rear housing 22 and has an open end facing toward the rear side. The rear housing 22 threadedly engages with the open end of the front housing 21 to that the front housing 21 and the rear housing 22 can rotate together. The clutch housing 2 rotates on a rotation axis $O_1$ that extends in the vehicle longitudinal direction.

The front housing 21 integrally includes a bottom portion 210 and a cylindrical portion 211. The bottom portion 210 is located closer to the front side that the cylindrical portion 211. The cylindrical portion 211 extends from the bottom portion 210 in the direction of the rotation axis $O_1$. The inner circumferential surface of the cylindrical portion 211 of the front housing 21 has multiple spline teeth 211*a* that are arranged along the rotation axis $O_1$. The bottom portion 210 of the front housing 21 is coupled by bolts 201 to the second yoke 112 of the cross joint 11. The bottom portion 210 of the front housing 21 has a through hole 210*a* that goes through the bottom portion 210 in the direction of the rotation axis $O_1$. A cap 202 is attached to the inside of the through hole 210*a*.

The rear housing 22 includes a first member 221, a second member 222, and a third member 223. The first member 221 is coupled to the front housing 21 and is made of a soft magnetic metal. The second member 222 is located radially inward of the first member and is made of a non-magnetic metal such as austenitic stainless steel. The third member 223 is located radially inward of the second member 222 and is made of a soft magnetic metal. The second member 222 is joined to the first member 221 and the third member 223 by welding.

The pinion gear shaft 3 integrally includes a pinion teeth portion 30 formed as a bevel gear, a first shaft portion 31 extending from a large end of the pinion teeth portion 30, and a second shaft portion 32 extending from a small end of the pinion teeth portion 30. The pinion teeth portion 30 has a conical shape and reduces in outer diameter toward the rear side. That is, the pinion teeth portion 30 is placed with the large end toward the front side and with the small end toward the rear side. The gear axis of the pinion teeth portion 30 coincides with the central axis of the first shaft portion 31 and the second shaft portion 32. The clutch housing 2 and the pinion gear shaft 3 are capable of rotating relative to each other on the same rotation axis $O_1$.

The first shaft portion 31 and the second shaft portion 32 of the pinion gear shaft 3 are supported by the differential carrier 6 through the first bearing 81 and the second bearing 82, respectively. The first and second bearings 81 and 82 are each a tapered roller heating. Details of the first and second bearings 81 and 82 including their supporting structure are described later.

The front housing 21 of the clutch housing 2 is supported by the pinion gear shaft 3 through the third bearing 83 fitted on a tip end of the first shaft portion 31. The rear housing 22 of the clutch housing 2 is supported by the pinion gear shaft 3 through the fourth bearing 44. The fourth bearing 84 is located closer to the rear side than the clutch mechanism 4 and is located closer to the front side than the first bearing 81. The pinion gear shaft 3 supports the clutch housing 2 through the third bearing 83 and the fourth bearing 84 and supports a rear-side end of the propeller shaft 106 through the clutch housing 2.

The third bearing 83 is a ball bearing and includes an inner ring 831, an outer ring 832, and multiple balls 833 that are located between the inner ring 831 and the outer ring 832. The axial position of the third bearing 83 is fixed by snap rings 834 and 835. The fourth bearing 84 is a ball bearing and includes an inner ring 841, an outer ring 842, and multiple balls 843 that are located between the inner ring 841 and the outer ring 842. The fourth bearing 84 is located between the third member 223 of the rear housing 22 and the first shaft portion 31 of the pinion gear shaft 3. The first shaft portion 31 has a step portion for restricting the axial movement of the inner ring 841. The third member 223 has a step portion for restricting the axial movement of the outer ring 842.

The cylindrical portion 211 of the front housing 21 accommodates at least part of the first shaft portion 31. The clutch mechanism 4 is located between the cylindrical portion 211 of the front housing 21 and the first shaft portion 31. The pinion teeth portion 30 and the second shaft portion 32 of the pinion gear shaft 3, and the differential mechanism 5 are accommodated in the differential carrier 6.

The clutch mechanism 4 includes a main clutch 41, a pilot clutch 42, and a cam mechanism 43. The main clutch 41 interrupts the transmission of the driving force between the front housing 21 and the pinion gear shaft 3. The pilot clutch 42 is arranged parallel to the main clutch 41 in the axial direction. The cam mechanism 43 converts, to a pressing force of the main clutch 41, part of torque of the clutch housing 2 transmitted by the pilot clutch 42.

The main clutch 41 includes multiple main outer clutch plates 411 and multiple main inner clutch plates 412 that alternate with the main outer clutch plates 411 along the axial direction parallel to the rotation axis $O_1$. The main outer clutch plates 411 have multiple projections 411*a* that engage with the spline teeth 211*a* of the cylindrical portion 211 of the front housing 21. This allows the main outer clutch plates 411 to move in the axial direction while preventing the main outer clutch plates 411 from rotating relative to the front housing 21. The main inner clutch plates 412 have multiple projections 412*a* that engage with an outer spline engagement portion 311 formed on the first shaft portion 31 of the pinion gear shaft 3. This allows the main inner clutch plates 412 to move in the axial direction while preventing the main inner clutch plates 412 from rotating relative to the pinion gear shaft 3.

The pilot clutch 32 includes a pilot outer clutch plate 421 and a pilot inner clutch plate 422 that alternates with the pilot outer clutch plate 421 along the axial direction parallel to the rotation axis $O_1$. The pilot outer clutch plate 421 engages with the spline teeth 211*a* of the cylindrical portion 211 of the front housing 21. This allows the pilot outer clutch plate 421 to move in the axial direction while preventing the pilot outer clutch plates 421 from rotating relative to the front housing 21. The pilot inner clutch plate 422 is splined-fitted to the outer surface of a later-described pilot cam 432 of the cam mechanism 43. This allows the pilot inner clutch plate 422 to move in the axial direction while preventing the pilot inner clutch plate 422 from rotating relative to the pilot cam 432.

The coil 70 is supplied with an exciting current from the controller 10 (refer to FIG. 1) and generates a magnetic force. The coil 70 is retained by the coil housing 71 fixed to the differential carrier 6 and is located between the first member 221 and the third member 223 of the rear housing 22. The coil 70 and the coil housing 71 are located radially outward of the first shaft portion 31 of the pinion gear shaft 3.

The armature 73 faces the pilot outer clutch plate 421 of the pilot clutch 42, has an annular shape, and is made of a soft magnetic metal. The armature 73 is splined-fitted to the spline teeth 211a of the cylindrical portion 211 of the front housing 21. This allows the armature 73 to move in the axial direction while preventing the armature 73 from rotating relative to the front housing 21.

The pilot outer clutch plate 421 and the pilot inner clutch plate 422 are located between the armature 73 and the rear housing 72 and are made of a soft magnetic material that allows magnetic flux generated by energizing the coil 70 to penetrate. When the controller 10 supplies an exciting current to the coil 70, magnetic flux is generated in a magnetic path that passes through the coil housing 71, the first member 221 and the third member 223 of the rear housing 22, the pilot outer clutch plate 421, the pilot inner clutch plate 422, and the armature 73. The armature 73 is attracted toward the rear housing 22 by the magnetic force of the magnetic flux. Accordingly, the pilot clutch 42 is pressed by the axial movement of the armature 73, the pilot outer clutch plate 421 and the pilot inner clutch plate 422 are brought into frictional contact with each other, and torque is transmitted from the front housing 21 to the cam mechanism 43.

The cam mechanism 43 includes a pilot cam 432, a main cam 431, and multiple cam balls 433. The pilot cam 432 is capable of rotating relative to the pinion gear shaft 3. The main cam 431 is incapable of rotating relative to the pinion gear shaft 3 and is capable of moving in the axial direction. The cam balls 433 are located between the main cam 431 and the pilot cam 432. A thrust needle roller bearing 85 is located between the pilot cam 432 and the third member 223 of the rear housing 22.

The respective facing surfaces of the main cam 431 and the pilot cam 432 have multiple cam grooves that face each other to allow the cam balls 433 to roll. The cam balls 433 are partly held in the cam grooves. The cam grooves extend in the circumferential direction of the main cam 431 and the pilot cam 432 and each have a bottom surface inclined with respect to the circumferential direction. The relative rotation between the main cam 431 and the pilot cam 432 of the cam mechanism 43 separates the main cam 431 and the pilot cam 432 from each other in the direction of the rotation axis $O_1$, thus generating a cam thrust force that moves the main cam 431 toward the main clutch 41. Accordingly, a pressing force in the axial direction is generated in the main clutch 41. At this time, the thrust needle roller bearing 85 receives the reaction force of a cam thrust force acting on the pilot cam 432.

The coil housing 71 integrally includes a retainer 711 that retains the coil 70, an extension portion 712 extending from the retainer 711 toward the pinion teeth portion 30, and a fixation portion 713 fixed to the differential carrier 6. A clearance is provided between the outer circumferential surface of the retainer 711 of the coil housing 71 and the inner circumferential surface of the first member 221 of the rear housing 22. A clearance is also provided between the outer circumferential surface of the retainer 711 of the coil housing 71 and the inner circumferential surface of the third member 223 of the rear housing 22.

The extension portion 712 has a cylindrical shape and is fitted to the inner surface of an opening of the differential carrier 6. The first shaft portion 31 of the pinion gear shaft 3 is inserted through the opening of the differential carrier 6. The first bearing 81 is located inside the extension portion 712. The coil housing 71 restricts the axial movement of the first bearing 81 toward the front side relative to the pinion gear shaft 3. The fixation portion 713 is fixed by a bolt 72 threadedly engaged with the differential carrier 6. Alternatively, the fixation portion 713 may be fixed to the differential carrier 6 by welding.

The first bearing 81 includes an inner ring 811, an outer ring 812, multiple tapered rollers 813 located between the inner ring 811 and the outer ring 812, and a cage 814 that retains the tapered rollers 813. The inner circumferential surface of the inner ring 811 is fitted to the outer circumferential surface of an end of the first shaft portion 31 of the pinion gear shaft 3, which is on the pinion teeth portion 30 side. The side surface of a large end of the inner ring 811 abuts against the pinion teeth portion 309. The outer circumferential surface of the outer ring 812 is fitted to the inner circumferential surface of the extension portion 712 of the coil housing 71. An annular plate shim 80 is located between the side surface of a large end of the outer ring 812 and the side surface of a portion of the retainer 711 that faces toward the rear side. The side surface of the large end of the outer ring 812 abuts against the shim 80. The outer ring 812 abutting against the shim 80 restricts the axial movement of the first bearing 81 relative to the pinion gear shaft 3.

The second bearing 82 includes an inner ring 821, an outer ring 822, multiple tapered rollers 823 that are located between the inner ring 821 and the outer ring 822, and a cage 844 that retains the tapered rollers 823. The inner circumferential surface of the inner ring 821 is fitted to the outer circumferential surface of the second shaft portion 32 of the pinion gear shaft 3. The side surface of a large end of the inner ring 821 abuts against the pinion teeth portion 30. The outer ring 822 is supported by a bearing supporter 61 of the differential carrier 6. The bearing supporter 61 has a fitting hole 610. The outer ring 822 is fitted and held in the fitting hole 610. The bearing supporter 61 further has a projection 611 for restricting the axial movement of the outer ring 822 toward the rear side.

The first bearing 81 and the second bearing 82 are preloaded by the fixation of the coil housing 71 to the differential carrier 6. In the manufacturing process of the driving force transmission apparatus 1, multiple shims 80 with different thicknesses are prepared, and one shim 80 having a suitable thickness is selected, for example, on the basis of a measured distance between the bearing supporter 61 and a mounting surface of the differential carrier 6 that the fixation portion 713 of the coil housing 71 is fixed to. Selecting the shim 80 in this manner preloads the first bearing 81 and the second bearing 82 within a suitable range when the bolt 72 is fully tightened so as to fix the fixation portion 713 of the coil housing 71.

The differential mechanism 5 includes a differential case 50, a pinion shaft 51 supported by the differential cased 50, a pair of pinion gears 52 rotatably supported on the pinion shaft 51, first and second side gears 53 and 54 that mesh with the pair of pinion gears 52 with their gear axes perpendicular to each other and that serve as output members, and a ring gear 55 that rotates along with the differential case 50 and that serves as a large diameter gear. The first side gear 53 is coupled to the drive axle 109L so as to rotate along with the drive axle 109L. The second side gear 54 is coupled to the drive axle 109R so as to rotate along with the drive axle 109R.

The ring gear 55 is fastened to the outer periphery of the differential case 50 by a bolt that is not illustrated in the drawings. Alternatively, the ring gear 55 may be fixed to the differential case 50 by welding. The driving force is transmitted between the clutch housing 2 and the ring gear 55 through the clutch mechanism 4 and the pinion gear shaft 3.

The differential mechanism 5 allows the driving force transmitted from the pinion gear shaft 3 to the ring gear 55 to be differentially outputted from the first and second side gears 53 and 54 to the drive axles 109L and 109R. The differential case 50, the first and second side gears 53 and 54, and the ring gear 55 rotate on a rotation axis $O_2$ that extends in the lateral direction of the four-wheel drive vehicle 100.

The differential case 50 integrally includes a holder 500 that accommodates the pair of pinion gears 52 and the first and second side gears 53 and 54, a first cylindrical portion 501 that the drive axle 109L is inserted through, and a second cylindrical portion 502 that the drive axle 109R is inserted through. The first cylindrical portion 501 and the second cylindrical portion 501 of the differential case 50 are rotatably supported by the differential carrier 6 through tapered roller bearings 86 and 87, respectively. The second cylindrical portion 502 is larger in length than the first cylindrical portion 501 in the direction of the rotation axis $O_2$ and intersects with the rotation axis $O_1$ of the pinion gear shaft 3.

The ring gear 55 is a bevel gear larger in diameter than the pinion teeth portion 30 and meshes with the pinion teeth portion 30. The ring gear 55 and the pinion teeth portion 30 are hypoid gears that are a type of bevel gear. The rotation axis $O_1$ of the pinion gear shaft 3 interests perpendicularly with the rotation axis $O_2$ of the ring gear 55 when the driving force transmission apparatus 1 is viewed in the height direction of the four-wheel drive vehicle 100.

The meshing between the ring gear 55 of the differential mechanism 5 and the pinion teeth portion 30 of the pinion gear shaft 3 and the meshing between the pair of pinion gears 52 and the first and second side gears 53 and 54 are each lubricated by a gear oil that is not illustrated in the drawings. The gear oil has a viscosity suitable for lubrication of the gear meshing. In the clutch mechanism 4, the frictional sliding between the main outer clutch plate 411 and the main inner clutch plate 412 and the frictional sliding between the pilot outer clutch plate 421 and the pilot inner clutch plate 422 are each lubricated by a clutch oil that is not illustrated in the drawings.

Although the gear oil used to lubricate the differential mechanism 5 and the clutch oil used to lubricate the clutch mechanism 4 are each a lubricating oil, the clutch oil has a viscosity smaller than the gear oil in order to avoid excessive drag torque. The first and second sealing members 91 and 92 are in sliding contact with the outer circumferential surface of the first shaft portion 31 of the pinion gear shaft 3 to isolate the gear oil and the clutch oil from each other, thereby preventing the gear oil and the clutch oil from mixing with each other. The first and second sealing members 91 and 92 are located between the clutch mechanism 4 and the pinion teeth portion 30 in the axial direction of the pinion gear shaft 3. The first and second sealing members 91 and 92 prevent the gear oil from leaking to where the clutch mechanism 4 is located and also prevent the clutch oil from leaking to where the differential mechanism 5 is located.

The first sealing member 91 is located between the inner circumferential surface of the coil housing 71 and the outer circumferential surface of the first shaft portion 31. The first sealing member 91 includes a core 911 and an elastic body 912. The core 911 is fitted to the inner periphery of the retainer 711 of the coil housing 71. The elastic body 912 has a lip in sliding contact with the outer circumferential surface of the first shaft portion 31 and is made of an elastic material, such as rubber. The elastic body 912 is jointed to the core 911, for example, by vulcanizing adhesion.

The second sealing member 92 is an X-ring that is made of an elastic material, such as rubber, and that has an X-shaped cross section. The second sealing member 92 is located between the inner circumferential surface of the clutch housing 2 and the outer circumferential surface of the first shaft portion 31. Specifically, the second sealing member 92 is located in an annular groove 223a formed in the third member 223 of the rear housing 22. The second sealing member 92 is located closer to the front side (i.e., closer to the clutch mechanism 4) than the first sealing member 91. According to this embodiment, the first sealing member 91 prevents the gear oil from entering as accommodation space (i.e., a space between the first member 221 and the third member 223 of the rare housing 22) that accommodates the coil 70, and the second sealing member 92 prevents the clutch oil from entering the accommodation space that accommodates the coil 70.

Alternatively, one of the first and second sealing members 91 and 92 may be omitted. At least one sealing member needs to be located between the clutch mechanism 4 and the pinion teeth portion 30 to prevent the gear oil from leaking to where the clutch mechanism 4 is located and to prevent the clutch oil from leaking to where the differential mechanism 5 is located. In this instance, to prevent the gear oil or the clutch oil from entering the accommodation space that accommodates the coil 70, the sealing member is placed, for example, between the coil housing 71 and the third member 223 of the rear housing 22. The specific structures of the first and second sealing members 91 and 92 are not limited to those illustrated in FIGS. 2 and 3.

The differential carrier 6 has insertion holes 601 and 602 that the drive axles 109L and 109R are respectively inserted through. Sealing members 93 and 94 are respectively fitted to the inner surfaces of the insertion holes 601 and 602. The clutch housing 2 has no contact with the differential carrier 6. The differential carrier 6 has an open end that is toward the front side and that is provided with a sealing member 95 having a lip in sliding contact with the first member 221 of the rear housing 22.

As described above, according to the embodiment, the second bearing 82 is located around the second shaft portion 32 of the pinion gear shaft 3 that is located closer to the rear side than the pinion teeth portion 30, the axial movement of the first bearing 81 is restricted by the coil housing 71, and the coil housing 71 is fixed to the differential carrier 6. These features reduce a driving force transmission distance that is an axial distance between the outer spline engagement portion 311 and the pinion teeth portion 30 of the pinion gear shaft 3. Further, the gear oil and the clutch oil are isolated from each other by the first sealing member 91 located inside the coil housing 71 and the second sealing member 92 located inside the rear housing 22. Thus, the first sealing member 91 and the second sealing member 92 are located to avoid an increase in the driving force transmission distance.

In the embodiment, the driving force transmission apparatus 1 is configured as a clutch-type differential apparatus having the differential mechanism 5. Alternatively, the invention may be applied to a transfer case that is mounted at a position closer to the front side than a propeller shaft in order to interrupt the transmission of a driving force to the propeller shaft. In this alternative, a driving force transmission apparatus has no differential mechanism, and a large diameter gear meshing with a pinion gear shaft is coupled to the propeller shaft.

What is claimed is:

1. A driving force transmission apparatus comprising:
a pinion gear shaft including a pinion teeth portion formed as a bevel gear, a first shaft portion extending from a large end of the pinion teeth portion, and a second shaft portion extending from a small end of the pinion teeth portion;
a large diameter gear meshing with the pinion teeth portion and formed of a bevel gear larger in diameter than the pinion teeth portion;
a cylindrical rotating member having a cylindrical portion that accommodates at least part of the first shaft portion, the cylindrical rotating member rotatable relative to the pinion gear shaft on a rotation axis in coincidence with a rotation axis of the pinion gear shaft;
a clutch mechanism located between the cylindrical portion of the cylindrical rotating member and the first shaft portion of the pinion gear shaft, the clutch mechanism being radially inward from the cylindrical rotating member with regard to an axis of rotation of the pinion gear shaft; and
a case member that accommodates the pinion teeth portion and the second shaft portion of the pinion gear shaft, and the large diameter gear, wherein
a driving force is transmitted between the cylindrical rotating member and the large diameter gear through the clutch mechanism and the pinion gear shaft,
the first shaft portion of the pinion gear shaft is supported by the case member through a first bearing and the second shaft portion of the pinion gear shaft is supported by the case member through a second bearing, and
the cylindrical rotating member is supported by the pinion gear shaft through a third bearing fitted on the first shaft portion.

2. The driving force transmission apparatus according to claim 1, further comprising:
a coil for generating an electromagnetic force that actuates the clutch mechanism; and
a coil housing that accommodates the coil, wherein
the coil housing is fixed to the case member, and
the coil housing restricts an axial movement of the first bearing relative to the pinion gear shaft.

3. The driving force transmission apparatus according to claim 2, wherein
the coil housing includes a retainer that retains the coil, an extension portion extending from the retainer toward the pinion teeth portion, and a fixation portion fixed to the case member, and
the first bearing is located inside the extension portion.

4. The driving force transmission apparatus according to claim 1, wherein
at least one sealing member is located between the clutch mechanism and the pinion teeth portion in an axial direction of the pinion gear shaft to suppress a gear oil for lubrication of the meshing between the pinion teeth portion and the large diameter gear from leaking to where the clutch mechanism is located.

5. The driving force transmission apparatus according to claim 2, further comprising:
a first sealing member located between an inner circumferential surface of the coil housing and an outer circumferential surface of the first shaft portion; and
a second sealing member located between an inner circumferential surface of the cylindrical rotating member and the outer circumferential surface of the first shaft portion, wherein
the first sealing member and the second sealing member suppress a gear oil for lubrication of the meshing between the pinion teeth portion and the large diameter gear from leaking to where the clutch mechanism is located.

6. The driving force transmission apparatus according to claim 1, further comprising:
a differential mechanism accommodated in the case member and configured to differentially output, from a pair of output members, the driving force transmitted to the large diameter gear.

7. A four-wheel drive vehicle comprising:
a driving force transmission apparatus including
a pinion gear shaft including a pinion teeth portion formed as a bevel gear, a first shaft portion extending from a large end of the pinion teeth portion, and a second shaft portion extending from a small end of the pinion teeth portion;
a large diameter gear meshing with the pinion teeth portion and formed of a bevel gear larger in diameter than the pinion teeth portion;
a cylindrical rotating member having a cylindrical portion that accommodates at least part of the first shaft portion, the cylindrical rotating member rotatable relative to the pinion gear shaft on a rotation axis in coincidence with a rotation axis of the pinion gear shaft;
a clutch mechanism located between the cylindrical portion of the cylindrical rotating member and the first shaft portion of the pinion gear shaft, the clutch mechanism being radially inward from the cylindrical portion with regard to an axis of rotation of the pinion gear shaft;
a case member that accommodates the pinion teeth portion and the second shaft portion of the pinion gear shaft, and the large diameter gear; and
a differential mechanism accommodated in the case member and configured to differentially output, from a pair of output members, the driving force transmitted to the large diameter gear, wherein
a driving force is transmitted between the cylindrical rotating member and the large diameter gear through the clutch mechanism and the pinion gear shaft,
the first shaft portion of the pinion gear shaft is supported by the case member through a first bearing and the second shaft portion of the pinion gear shaft is supported by the case member through a second bearing,
the cylindrical rotating member is supported by the pinion gear shaft through a third bearing fitted on the first shaft portion,
the four-wheel drive vehicle is configured such that the driving force of a driving source is always transmitted to a pair of right and left front wheels and such that the driving force of the driving source is transmitted through the driving force transmission apparatus to a pair of right and left rear wheels,
the cylindrical rotating member is coupled to a drive shaft for transmitting the driving force in a vehicle longitudinal direction, and
the pinion gear shaft supports one end of the drive shaft through the cylindrical rotating member.

8. The driving force transmission apparatus according to claim 1, wherein the cylindrical rotating member is directly coupled to the drive shaft by a yoke.

9. The driving force transmission apparatus according to claim 1, wherein the third bearing is radially between an end portion the first shaft portion and an inner peripheral portion of the cylindrical rotating member.

* * * * *